(12) United States Patent
Yasui et al.

(10) Patent No.: US 9,853,276 B2
(45) Date of Patent: Dec. 26, 2017

(54) BATTERY PACK

(71) Applicant: Panasonic Intellectual Property Management Co., Ltd., Osaka (JP)

(72) Inventors: Shunsuke Yasui, Osaka (JP); Keisuke Naito, Osaka (JP); Minari Fukuzumi, Wakayama (JP); Sigeto Noya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 111 days.

(21) Appl. No.: 14/655,646

(22) PCT Filed: Jan. 8, 2014

(86) PCT No.: PCT/JP2014/000021
§ 371 (c)(1),
(2) Date: Jun. 25, 2015

(87) PCT Pub. No.: WO2014/109284
PCT Pub. Date: Jul. 17, 2014

(65) Prior Publication Data
US 2015/0349314 A1     Dec. 3, 2015

(30) Foreign Application Priority Data
Jan. 11, 2013   (JP) ................................ 2013-003123

(51) Int. Cl.
*H01M 2/34*   (2006.01)
*H01M 2/20*   (2006.01)
(Continued)

(52) U.S. Cl.
CPC ......... *H01M 2/206* (2013.01); *H01M 2/1094* (2013.01); *H01M 2/34* (2013.01);
(Continued)

(58) Field of Classification Search
None
See application file for complete search history.

(56) References Cited

U.S. PATENT DOCUMENTS

| | | |
|---|---|---|
| 5,238,083 A | 8/1993 | Horie et al. |
| 2006/0016633 A1 | 1/2006 | Fujii et al. |

(Continued)

FOREIGN PATENT DOCUMENTS

| | | |
|---|---|---|
| JP | 2003-059467 A | 2/2003 |
| JP | 2008-041507 A | 2/2008 |

(Continued)

OTHER PUBLICATIONS

International Search Report issued in PCT/JP2014/000021, dated Feb. 25, 2014, with English translation.

*Primary Examiner* — Yoshitoshi Takeuchi
(74) *Attorney, Agent, or Firm* — McDermott Will & Emery LLP

(57) ABSTRACT

Disclosed herein is a battery pack which includes a plurality of battery modules housed in a housing. The battery modules are connected in series to each other via connecting members that connects external terminals of the battery modules to each other. The battery modules are classified into groups, each being comprised of at least two of the battery modules, two terminal ones of which have a potential difference of at most V or less between themselves. A first connecting member connects the external terminals of the battery modules to each other between two adjacent ones of the groups. A second connecting member connects the external terminals of the battery modules to each other within an identical one of the groups. If water penetrates into the housing, the first connecting member is electrically cut off, preferentially relative to the second connecting member.

8 Claims, 7 Drawing Sheets

(51) Int. Cl.
*H01M 2/10* (2006.01)
*H01M 10/42* (2006.01)
*H01M 10/48* (2006.01)

(52) U.S. Cl.
CPC ....... *H01M 10/4207* (2013.01); *H01M 10/48* (2013.01); *H01M 2/1077* (2013.01); *H01M 2200/00* (2013.01); *H01M 2220/20* (2013.01)

(56) References Cited

U.S. PATENT DOCUMENTS

| | | | |
|---|---|---|---|
| 2010/0028723 A1 | 2/2010 | Haba | |
| 2012/0106017 A1* | 5/2012 | Schumacher | B60L 3/04 361/114 |
| 2012/0107651 A1* | 5/2012 | Hotta | H01M 2/202 429/61 |
| 2012/0194004 A1 | 8/2012 | Lim | |
| 2012/0315807 A1* | 12/2012 | Sakae | H01M 2/206 439/887 |
| 2013/0280560 A1 | 10/2013 | Lim | |
| 2015/0280185 A1* | 10/2015 | Lampe-Onnerud | H01M 2/1077 429/9 |

FOREIGN PATENT DOCUMENTS

| | | |
|---|---|---|
| JP | 2008-282625 A | 11/2008 |
| JP | 2010-092841 A | 4/2010 |
| JP | 2011-173447 A | 9/2011 |
| JP | 2011-204574 A | 10/2011 |
| JP | 2013-225464 A | 10/2013 |

* cited by examiner even in case of entry of water or undesirable substances into the battery pack.

BATTERY PACK

RELATED APPLICATIONS

This application is the U.S. National Phase under 35 U.S.C. §371 of International Application No. PCT/JP2014/000021, filed on Jan. 8, 2014, which in turn claims the benefit of Japanese Application No. 2013-003123, filed on Jan. 11, 2013, the disclosures of which Applications are incorporated by reference herein.

TECHNICAL FIELD

The present invention relates to a battery pack including a plurality of battery modules housed in a case.

BACKGROUND ART

Battery packs, each including a plurality of batteries housed in a case so as to output a predetermined voltage and have a predetermined capacity, are widely used as power sources for various devices, vehicles, and other kinds of equipment. In particular, people have recently adopted more and more often techniques for connecting together general-purpose batteries in parallel/series to turn batteries assemblies thus formed into battery modules, each of which outputs a predetermined voltage and has a predetermined capacity, and making various combinations of such battery modules to enable their application in a wide variety of equipment (see, for example, Patent Document 1). This modularization technique reduces the size and weight of the battery modules themselves by enhancing the performance of the batteries to be packed together in the battery modules. Thus, this modularization technique provides various advantages. For example, this technique allows for assembling the battery packs more efficiently and mounting the battery packs more flexibly in a limited space such as a predetermined space in an automobile.

CITATION LIST

Patent Document

PATENT DOCUMENT 1: Japanese Unexamined Patent Publication No. 2011-204574

SUMMARY OF THE INVENTION

Technical Problem

Meanwhile, when a battery pack has been mounted on a vehicle such as an automobile and the vehicle travels on a flooded road, for example, water or undesirable substances might enter the battery pack unexpectedly. Even if the battery pack is hermetically sealed with, e.g., packing, the vibration of the vehicle, external impact, or any other factor may cause the packing to go too loose to keep sealing the battery pack hermetically enough. In such a case, there could still be chances of water or undesirable substances entering the battery pack. In the known art, however, little or no consideration has been given to how to ensure the safety of battery packs in case of entry of water or undesirable substances into the battery packs from some cause or other.

In view of the foregoing background, it is therefore a main object of the present invention to provide a battery pack capable of maintaining the safety even in case of entry of water or undesirable substances into the battery pack.

Solution to the Problem

A battery pack according to the present invention includes a plurality of battery modules, and a housing to house the plurality of battery modules. The battery modules are connected in series to each other via connecting members that connects external terminals of the battery modules to each other. The battery modules are classified into groups, each being comprised of at least two of the battery modules, two terminal ones of which have a potential difference of at most 60 V or less between themselves. A first one of the connecting members connects the external terminals of the battery modules in series to each other between two adjacent ones of the groups. A second one of the connecting members connects the external terminals of the battery modules in series to each other within an identical one of the groups. If water penetrates into the housing, the first connecting member is electrically cut off, preferentially relative to the second connecting member.

In a preferred embodiment, the connecting members are made of materials which are dissolvable in the water that has penetrated into the housing, and the material forming the first connecting member has a higher dissolution rate than the material forming the second connecting member.

In another preferred embodiment, the first connecting member is made of copper and the second connecting member is made of aluminum.

Advantages of the Invention

The present invention provides a battery pack which is capable of maintaining safety even in case of entry of water or undesirable substances into the battery pack.

DESCRIPTION OF EMBODIMENTS

First of all, the circumstances under which the present invention was conceived will be described before embodiments of the present invention are set forth.

Figure 1:
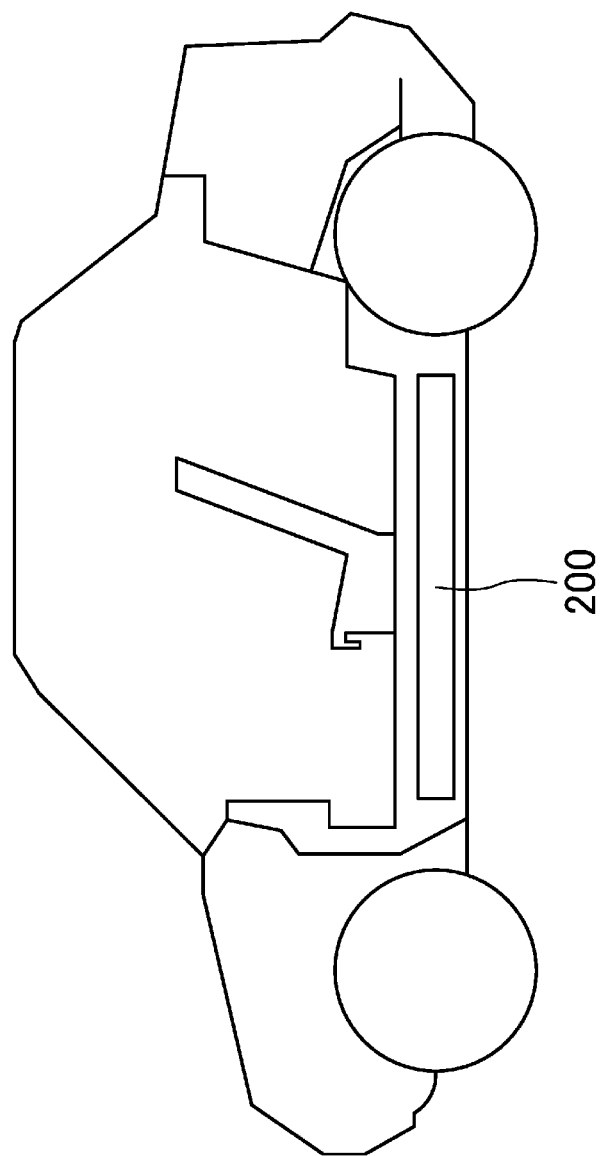
FIG. 1 shows an example in which a battery pack is mounted on a vehicle such as an automobile.

FIG. 1 shows an example in which a battery pack 200 is mounted on a vehicle such as an automobile. In the example of FIG. 1, the battery pack 200 is mounted in a space left under the seats of the vehicle, for example. Here, the battery pack 200 includes multiple battery modules housed in a housing.

Figure 2:
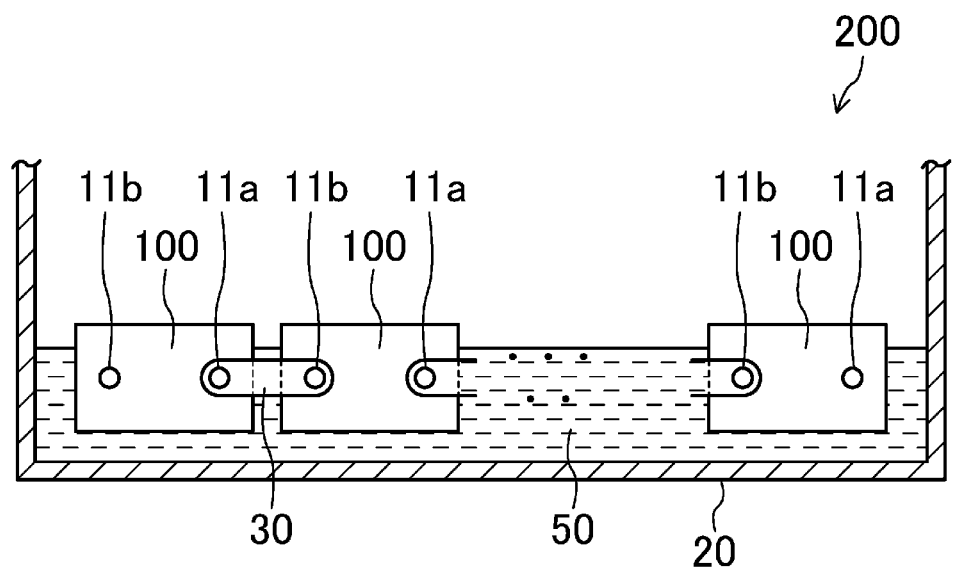
FIG. 2 shows a battery pack in a state where water has penetrated into its housing.

FIG. 2 shows a battery pack 200 which includes multiple battery modules 100 housed in a housing 20 and of which the housing 20 is flooded with water that has penetrated into it. Here, the battery modules 100 are each housed in an insulating case, and the positive and negative external terminals 11a and 11b of the battery modules 100 are connected in series to each other via connecting members (bus bars) 30. For example, in a battery pack 200 installed in an electric vehicle, the potential difference between two terminal ones of a large number of series-connected battery modules 100 may reach as much as 200 V or more.

Supposing that water having a high electrical conductivity such as seawater (hereinafter, referred to simply as "water") has penetrated into the housing 20, that the connecting members 30 are immersed in the water, and that the housing 20 is made of a metallic material, at a high voltage between those series-connected battery modules, some electricity may leak to the housing 20 via the water. If a person accidentally touches the housing 20 in such a state, the person may receive an electric shock.

In the known art, however, little or no consideration has been given to the safety precaution against electric shocks which can be caused when water or undesirable substances enter battery packs from some cause or other.

The present invention was made on the basis of this finding, and one of its objects is to provide a battery pack which can prevent an electric shock from being given to a person who has happened to touch the battery pack, even in case of entry of water such as seawater into the battery pack.

Embodiments of the present invention will now be described in detail with reference to the drawings. Note the present invention is not limited to the following embodiments. Various changes and modifications may be made without departing from the scope of the present invention, and any of the embodiments to be described below may be combined with any other embodiments as necessary.

Figure 3:
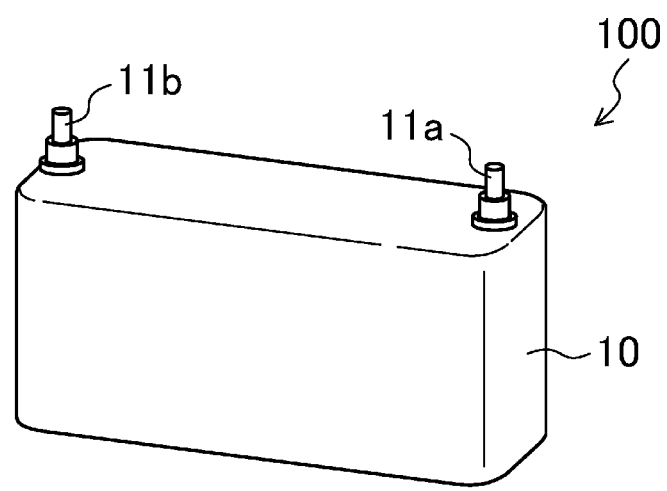
FIG. 3 is a perspective view showing a configuration for a battery module according to an embodiment of the present invention.

FIG. 3 is a perspective view showing a configuration for a battery module 100 according to an embodiment of the present invention.

As shown in FIG. 3, the battery module 100 includes multiple batteries (not shown) which are connected together in series and housed in an insulating case 10. The battery module 100 may also include, in addition to such batteries connected in series, multiple butteries which are connected in parallel with one another. Further, external terminals 11a and 11b are provided on a side face of the case 10.

Figure 4:
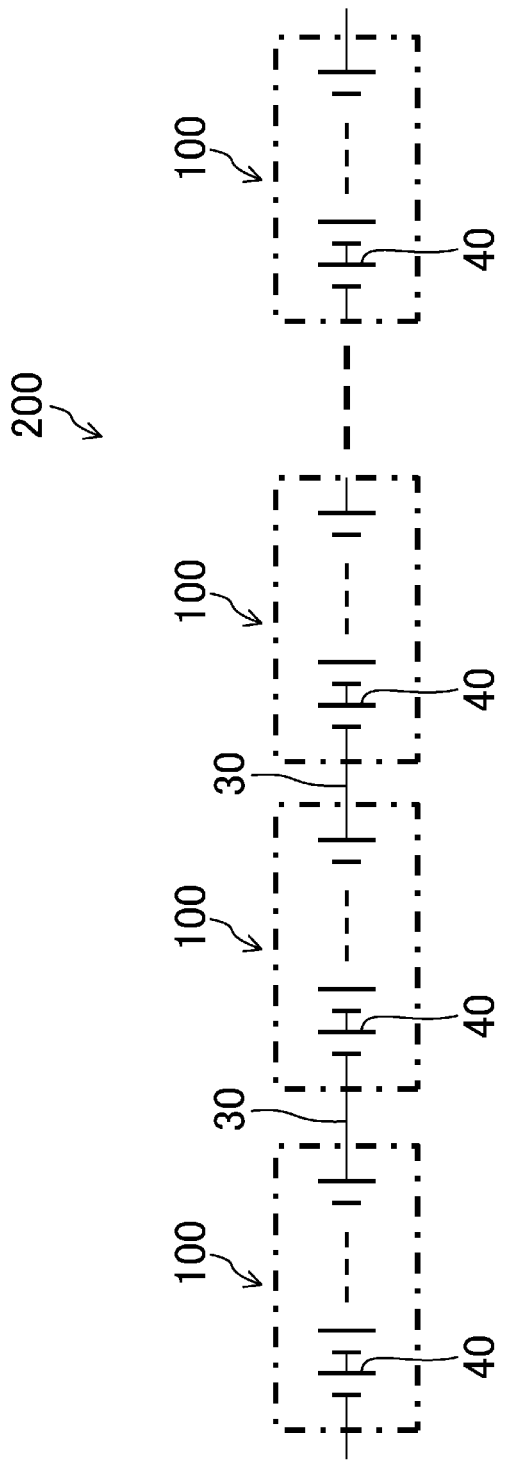
FIG. 4 is a conceptual diagram showing a configuration for a battery pack according to an embodiment of the present invention.

FIG. 4 is a conceptual diagram showing a configuration for a battery pack 200 according to an embodiment of the present invention.

As shown in FIG. 4, the battery pack 200 includes battery modules 100, each of which includes multiple batteries 40 that are connected together in series, and the battery modules 100 themselves are connected in series to one another via connecting members 30. For example, if the battery pack 200 is comprised of ten series-connected battery modules 100, each including ten batteries that are connected in series, then the battery pack 200 has a configuration in which 100 batteries are connected together in series.

Each of the batteries 40 shown in FIG. 4 does not have to be a single battery but may comprise multiple batteries that are connected in parallel with each other. Further, the battery pack 200 may also include, in addition to those series-connected battery modules 100, multiple other battery modules 100 that are connected in parallel with each other.

Here, each of the batteries 40 housed in the battery modules 100 is not limited to any particular type. For example, a cylindrical lithium ion battery may be used as the battery 40.

In the context of the present invention, the term "battery module" refers herein to an assembly of multiple batteries which are housed in an insulating case. There is no difference between the "battery module" of the present invention and a battery block or a battery assembly, for example.

Figure 5:
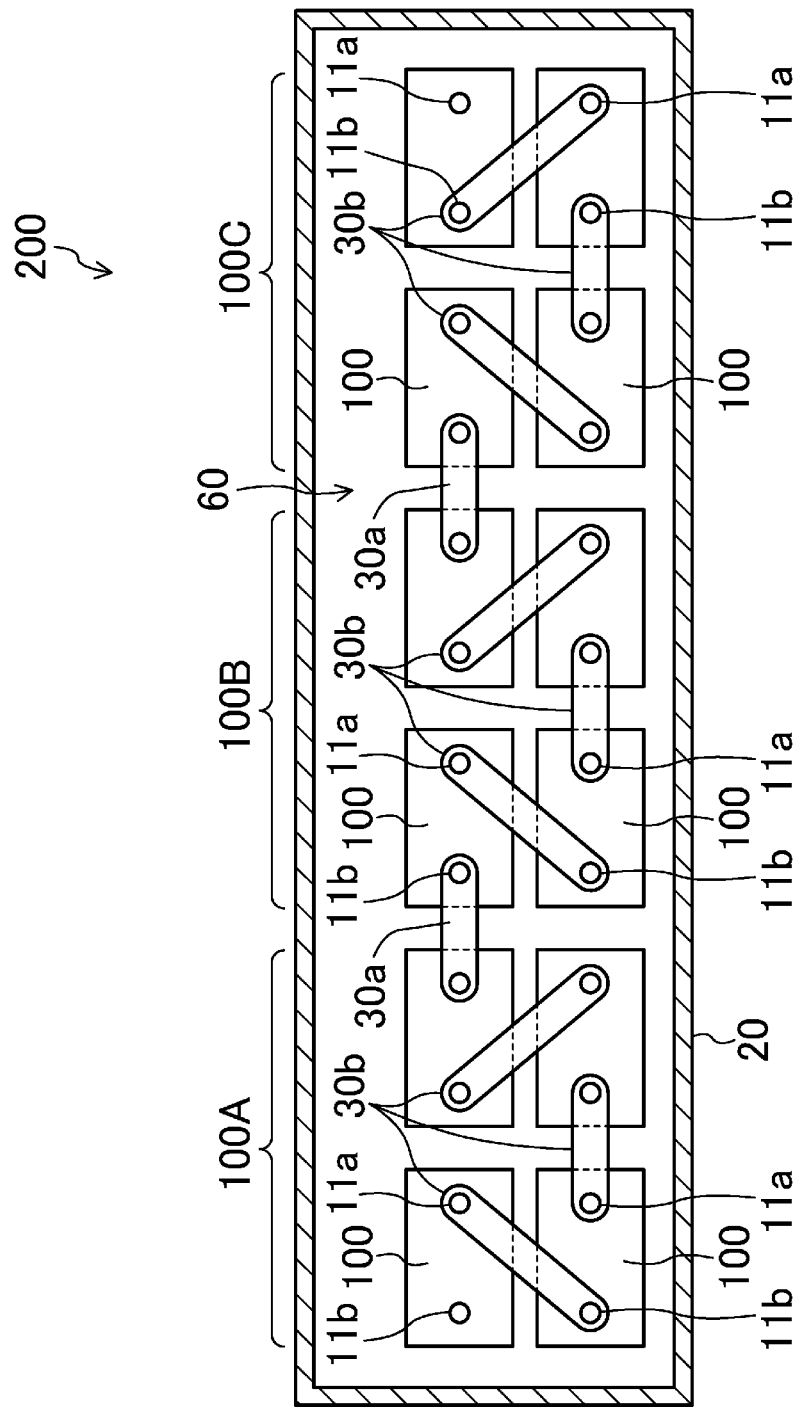
FIG. 5 is a cross-sectional view showing a configuration for a battery pack according to an embodiment of the present invention.

FIG. 5 is a cross-sectional view showing a configuration for a battery pack 200 of this embodiment.

As shown in FIG. 5, the battery pack 200 includes multiple battery modules 100 housed in a housing 20. Each of the battery modules 100 is housed in an insulating case equipped with external terminals 11a and 11b. The external terminals 11a and 11b of the battery modules 100 are connected to each other via connecting members 30a and 30b.

Figure 6A:
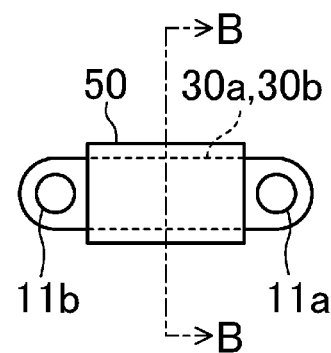
FIGS. 6A and 6B show a configuration for a connecting member according to an embodiment of the present invention.
Figure 6B:
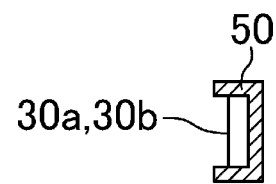

As shown in FIGS. 6A and 6B, each of the connecting members 30a and 30b may be covered with an insulating jacket 50 entirely but their portions connected to the external terminals 11a and 11b. Here, FIG. 6A is a front view of the connecting member 30a or 30b, and FIG. 6B is a cross-sectional view taken along the line B-B. This configuration allows for preventing an electric shock from being given to a person who has accidentally touched the connecting member 30a or 30b.

The battery pack 200 shown as an example in FIG. 5 includes twelve battery modules 100 that are connected together in series. For example, if the potential difference between the external terminals 11a and 11b of each battery module is 15 V, the potential difference between two terminal ones of the twelve series-connected battery modules 100 amounts to 180 V.

The multiple battery modules 100 that form the battery pack 200 are classified into Groups 100A, 100B, and 100C in each of which the potential difference between two terminal ones (i.e., two end battery modules) of the series-connected battery modules 100 is smaller than a potential difference (of at most 60 V or less) which may conceivably cause an electric shock accident.

The battery pack 200 shown as an example in FIG. 5 is classified into the three Groups 100A, 100B, and 100C each being comprised of four battery modules 100. In this case, the potential difference between two terminal ones of the series-connected battery modules is 60 V in each of these Groups 100A, 100B, and 100C. Naturally, grouping may be done in any arbitrary manner, and the number of the battery modules 100 included may vary from one group to another.

In this embodiment, between the adjacent Groups 100A and 100B and between the adjacent Groups 100B and 100C, the external terminal 11a of one battery module is connected in series to the external terminal 11b of another battery module via an associated one of the first connecting members 30a. Further, in each of the Groups 100A to 100C, the external terminal 11a of one battery module is connected in series to the external terminal 11b of another battery module via an associated one of the second connecting members 30b. The first connecting members 30a are configured to be electrically cut off, preferentially relative to the second connecting members 30b in case of penetration of water into the housing 20.

These connecting members 30a and 30b are made of materials which are dissolvable in the water that may have penetrated into the housing 20. Specifically, the material forming the first connecting members 30a has a higher dissolution rate than the material forming the second connecting members 30b. For example, the first connecting members 30a may be made of copper, and the second connecting members 30b may be made of aluminum.

Figure 7:
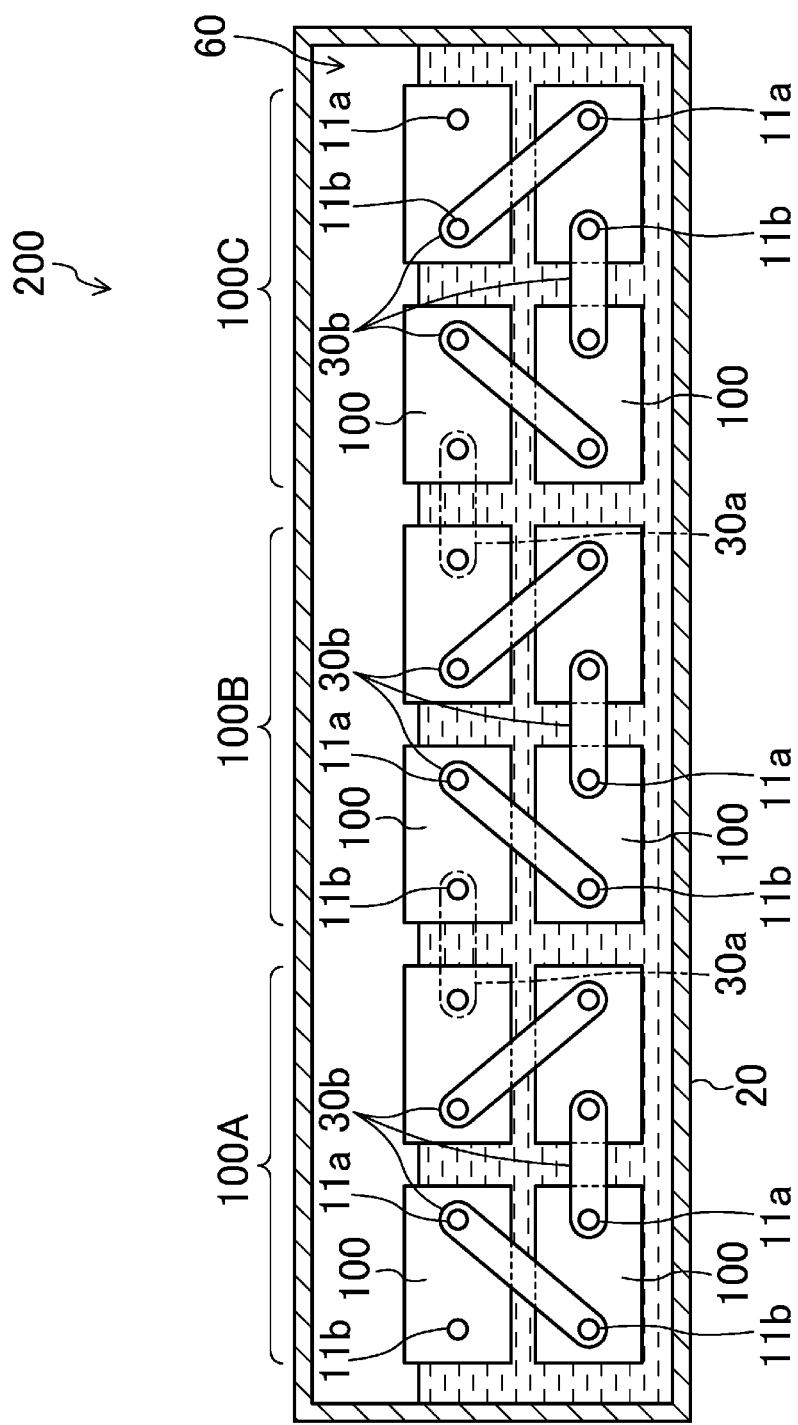
FIG. 7 is a cross-sectional view showing a configuration for a battery pack according to an embodiment of the present invention.

As shown in FIG. 7, if water penetrates into the housing 20 to have the connecting members 30a and 30b immersed therein, the copper forming the first connecting members 30a chemically reacts with, and dissolves in, the water. In particular, if any direct current is flowing through the first connecting members 30a, the chemical reaction with the water is accelerated, and consequently, the copper dissolves in the water faster. For example, if the first connecting member 30a which is made of a piece of copper that has a thickness of 1 mm and a size of 10 mm×30 mm is immersed in water containing 5% salt and a direct current of 10 A is flowing through the first connecting member 30a, it takes about ten minutes for the first connecting member 30a to dissolve completely in the water.

Thus, if the copper forming the first connecting members 30a dissolves in water within a relatively short period of time since the immersion of the connecting members 30 in the water to the point that both Groups 100A and 100B and Groups 100B and 100C can be electrically disconnected from each other, there can be only a potential difference (of 60 V at maximum), which is generated by Groups 100A, 100B, and 100C, each comprised of four battery modules, between the housing 20 and the external terminals 11a and 11b. This allows for preventing electric shock accidents. As a result, even in case that water such as seawater has entered the battery pack, an electric shock can be prevented from being given to a person who has accidentally touched the battery pack.

According to the present invention, the material forming the first connecting members 30a that connect the external terminals 11a and 11b of the battery modules 100 between the groups has a higher dissolution rate than the material forming the second connecting members 30b that connect the external terminals 11a and 11b of the battery modules 100 within the same group. Therefore, even if water penetrates into the housing 20, the battery modules that generate a potential difference equal to or greater than the potential difference between two terminal ones of the series-connected battery modules in each group can be electrically disconnected from each other. This allows for elimination of a large potential difference which could be generated between the housing 20 and the external terminals 11a and 11b and which could be a main cause of an electric shock accident. As a result, even if water such as seawater penetrates into the housing 20, an electric shock can be prevented from being given to a person who has accidentally touched the battery pack.

Meanwhile, according to the present invention, the material forming the first connecting members 30a has a higher dissolution rate than the material forming the second connecting members 30b and therefore the first connecting members 30a are allowed to dissolve preferentially relative to the second connecting members 30b in case of penetration of water into the housing 20, thereby electrically disconnecting the groups from each other.

Therefore, some materials were subjected to the following test to examine whether they are applicable to the connecting members 30a and 30b of the present invention.

One liter of salt water with a concentration of 5% was poured into a vessel. A positive electrode terminal and a negative electrode terminal were bathed in the salt water, and a voltage of 100 V was applied between these terminals for six minutes. The percentages of dissolution of the material forming the positive electrode terminal and the material forming the negative electrode terminal were measured. In the test, the distance between the terminals was set to be 20 mm. For each of the positive and negative electrode terminals, the rate of change in the mass of its portion that was under the salt water was determined to be the percentage of dissolution of the material for that terminal. As the materials for the terminals, aluminum (Al), copper (Cu), and stainless steel (Sus) were used. Specifically, the terminals having a width of 30 mm were each made of an aluminum flat plate having a thickness of 1.5 mm, a copper flat plate having a thickness of 1.0 mm, or a stainless steel flat plate having a thickness of 5 mm Each terminal was bathed such that its portion under the salt water was 10 mm long.

Table 1 shows the results of the test. As can be seen from Table 1, the positive electrode terminals dissolved, and the positive electrode terminal of copper had the highest percentage of dissolution. The percentage of dissolution of the negative electrode terminals was negative because something was deposited on the negative electrode terminals.

TABLE 1

| Combination of Terminals | Percentage of Dissolution (%) | |
|---|---|---|
| | Negative Electrode | Positive Electrode |
| Negative Electrode: Al Positive Electrode: Al | 1.21 | 29.7 |
| Negative Electrode: Cu Positive Electrode: Cu | −3.04 | 74.9 |
| Negative Electrode: Al Positive Electrode: Cu | −7.88 | 78.5 |
| Negative Electrode: Cu Positive Electrode: Al | −0.28 | 37.0 |
| Negative Electrode: Sus Positive Electrode: Sus | −0.13 | 17.8 |

Next, variations in the percentage of dissolution were measured with the distance between the negative electrode terminal of aluminum and the positive electrode terminal of copper varied.

Table 2 shows the results of the measurement. As can be seen from Table 2, the variations in the distance between the terminals within the range from 20 mm to 100 mm did not cause variations in the percentage of dissolution of the copper. The following Table 2 also shows that when the duration for which the voltage was applied between the terminals was lengthened to ten minutes, the percentage of dissolution of the positive electrode terminal reached 100%, that is to say, the positive electrode terminal dissolved completely.

TABLE 2

| Combination of Terminals | Distance between Terminals (mm) | Duration (min) | Percentage of Dissolution (%) | |
|---|---|---|---|---|
| | | | Negative Electrode | Positive Electrode |
| Negative Electrode: Al Positive Electrode: Cu | 20 | 6 | −7.88 | 78.5 |
| | 50 | 6 | −6.06 | 79.3 |
| | 100 | 6 | −6.06 | 74.3 |
| | 100 | 10 | −12.15 | 100.0 |

The foregoing results show that copper is preferable as a material for the first connecting members 30a applicable to the present invention. If copper is used to form the first connecting members 30a, it is preferable to use aluminum or stainless steel to form the second connecting members 30b.

Table 1 shows that when the negative electrode terminal of copper was combined with the positive electrode terminal of aluminum, the copper of the negative electrode terminal did not dissolve, whereas the aluminum of the positive electrode terminal dissolved. The battery pack of the present invention includes, however, a plurality of battery modules that are connected together in series. Therefore, if the first connecting member 30a connected to the higher potential member is made of copper, the copper forming the first connecting member 30a will dissolve.

According to the present invention, when immersed in water, the first connecting members 30a do not have to dissolve completely. It is suitable that part of the first connecting member 30a each dissolves to cut off continuity between the associated external terminals 11a and 11b.

Further, the amount of time it takes to dissolve each first connecting member 30a can be shortened without changing its resistance by reducing its thickness and increasing its width such that the cross-sectional area of each first connecting member 30a remains unchanged.

Even if each first connecting member 30a is covered with the insulating jacket 50 as shown in FIGS. 6A and 6B, the exposed portion of each first connecting member 30a that is not covered with the jacket 50 is immersed in water that has penetrated into the housing 20. Therefore, the dissolution of each first connecting member 30a is not interfered with.

Figure 8:
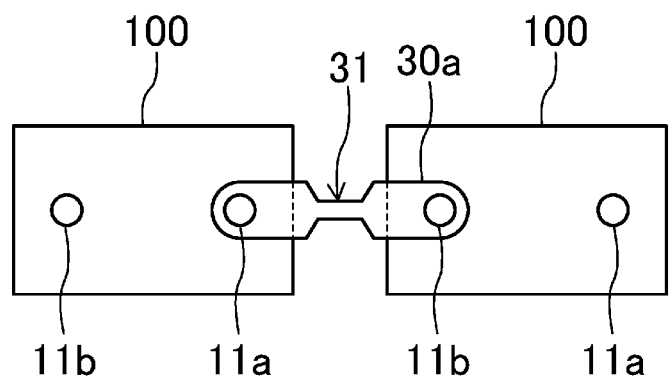
FIG. 8 shows a configuration for a first connecting member of the present invention.

FIG. 8 shows the configuration for a first connecting member 30a designed to shorten the cutoff time. As shown in FIG. 8, this first connecting member 30a has a portion 31 with a reduced width (i.e., with a reduced cross-sectional area). Therefore, if this first connecting member 30a is immersed in water, the portion 31 dissolves preferentially relative to the other portions, and the first connecting member 30a can be cut off in a shorter time. The first connecting member 30a may have a portion with a reduced thickness, instead of the portion 31 with a reduced width.

The present invention has been described above with reference to some preferred embodiments thereof. Note that the foregoing description is not intended to limit the scope of the present invention. Naturally, various changes and modifications can be readily made to those embodiments. For example, in the battery pack of the above embodiment, the battery modules are classified into multiple groups in each of which the potential difference between two terminal ones of the series-connected battery modules is 60 V. However, this is only an example of the present invention. The battery modules may also be classified into groups, in each of which the potential difference between two terminal ones of the series-connected battery modules is equal to or smaller than a potential difference (of 60 V at most) which may conceivably cause an electric shock accident. For example, if the battery modules 100 of the battery pack 200 as shown in FIG. 5 are classified into four groups, each comprised of three battery modules 100, the potential difference between two terminal ones of the series-connected battery modules in each group will be 45 V.

Further, in the forgoing embodiments, the first connecting members 30a to be electrically cut off are supposed to be made of the material dissolvable in water which may have penetrated into the housing 20. However, this is only an example of the present invention. Alternatively, a sensor configured to detect the immersion of the battery modules 100 in water may be provided in the housing 20, and the first connecting members 30a that connect the external terminals 11a and 11b between Groups 100A, 100B, and 100C may each include a breaker mechanism which is configured to electrically cut off the first connecting member 30a in response to a detection signal from the sensor.

In addition, the battery pack 200, which is supposed to be comprised, in the forgoing embodiment, of a plurality of battery modules 100 that are assembled together, may also be comprised of multiple batteries assembled together. In that case, in the battery pack 200 shown in FIG. 4, each battery module 100 comprised of multiple series-connected batteries 40 is replaced with a single large battery. Specifically, the battery pack 200 according to another embodiment includes multiple batteries and a housing which houses the multiple batteries. The electrode terminals of the batteries are connected in series to each other via connecting members. Those batteries are classified into multiple groups, each of which is comprised of at least two of the batteries and has a potential difference of at most 60 V or less between two terminal ones of the series-connected batteries. Between adjacent ones of the groups, the electrode terminals of the batteries are connected in series to each other via a first connecting member, whereas the electrode terminals of the batteries included in each group are connected in series to each other via a second connecting member. If water penetrates into the housing, the first connecting member is electrically cut off, preferentially relative to the second connecting member.

In the forgoing embodiments, water such as seawater is supposed to enter the battery pack. The battery pack of the present invention also provides the same or similar advantage when cooling liquid (or a coolant) leaks from a cooling pipe arranged in the battery pack in order to cool the battery modules in the battery pack.

The present invention has the advantage that even when water such as seawater enters the battery pack or even when cooling liquid (or a coolant) leaks out of a cooling pipe arranged in the battery pack, a person who has accidentally touched the battery pack is prevented from receiving an electrical shock. This advantage is attributable to the configuration of the battery pack in which the multiple battery modules are classified into groups, each of which is comprised of at least two of the battery modules and in which the potential difference between two terminal ones is equal to or smaller than a potential difference (of 60 V at most) which may conceivably cause an electric shock accident. This configuration is also advantageous when water such as seawater that has entered the battery pack may generate an arc discharge between the housing and the external terminals of the battery modules, of which the potential difference between their terminal ones is large. Specifically, in the battery pack, the battery modules are classified into groups, each of which is comprised of at least two of the battery modules and in which the potential difference between their terminal ones is smaller than a potential difference (of 50 V to 150 V) which may conceivably cause an arc discharge. If water enters the battery pack, the first connecting member connecting the groups to each other is cut off, thereby preventing the occurrence of an arc discharge. In this manner, firing or rupture of the batteries which could be caused by an arc discharge can be prevented.

INDUSTRIAL APPLICABILITY

The present invention is useful as power sources for automobiles, electric motorcycles, electric amusement rides, and other kinds of equipment.

DESCRIPTION OF REFERENCE CHARACTERS

10 Case
11a, 11b External Terminal
20 Housing
30 Connecting Member
30a First Connecting Member
30b Second Connecting Member
40 Battery
50 Jacket
100 Battery Module
100A, 100B, 100C Group
200 Battery Pack

The invention claimed is:

1. A battery pack comprising:
a plurality of batteries, and
a housing to house the plurality of batteries, wherein
electrode terminals of the batteries are connected in series to each other via connecting members,
the batteries are classified into groups, each being comprised of at least two of the batteries,
a first one of the connecting members connects the electrode terminals of the batteries in series to each other between two adjacent ones of the groups,
a second one of the connecting members connects the electrode terminals of the batteries in series to each other within an identical one of the groups, and
a material forming the first connecting member has a higher dissolution rate than a material forming the second connecting member such that if water penetrates into the housing, the first connecting member is electrically cut off, preferentially relative to the second connecting member by the water that has penetrated into the housing.

2. The battery pack of claim 1, wherein
the first connecting member is made of copper and the second connecting member is made of aluminum.

3. The battery pack of claim 1, wherein
a sensor configured to detect penetration of water into the housing is provided in the housing, and
the first connecting member includes a breaker mechanism configured to electrically cut off the first connecting member in response to a detection signal from the sensor.

4. The battery pack of claim 1, wherein
the housing is made of a metallic material.

5. A battery pack comprising:
a plurality of battery modules, and
a housing to house the plurality of battery modules, wherein
the battery modules are connected in series to each other via connecting members that connects external terminals of the battery modules to each other,
the battery modules are classified into groups, each being comprised of at least two of the battery modules,
a first one of the connecting members connects the external terminals of the battery modules in series to each other between two adjacent ones of the groups,
a second one of the connecting member connects the external terminals of the battery modules in series to each other within an identical one of the groups, and
a material forming the first connecting member has a higher dissolution rate than a material forming the second connecting member such that if water penetrates into the housing, the first connecting member is electrically cut off, preferentially relative to the second connecting member by the water that has penetrated into the housing.

6. The battery pack of claim 5, wherein
the first connecting member is made of copper and the second connecting member is made of aluminum.

7. The battery pack of claim 5, wherein
a sensor configured to detect penetration of water into the housing is provided in the housing, and
the first connecting member includes a breaker mechanism configured to electrically cut off the first connecting member in response to a detection signal from the sensor.

8. The battery pack of claim 5, wherein
the housing is made of a metallic material.

* * * * *